(12) United States Patent
Li et al.

(10) Patent No.: US 9,751,257 B2
(45) Date of Patent: Sep. 5, 2017

(54) ULTRASONIC WELDER CLAMP

(71) Applicant: GM GLOBAL TECHNOLOGY OPERATIONS LLC, Detroit, MI (US)

(72) Inventors: Yongqiang Li, Rochester, MI (US); Saul S Lee, Franklin, MI (US); Bradley J. Blaski, Sterling Heights, MI (US); Jorge F. Arinez, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 14/735,555

(22) Filed: Jun. 10, 2015

(65) Prior Publication Data

US 2015/0360414 A1     Dec. 17, 2015

Related U.S. Application Data

(60) Provisional application No. 62/013,327, filed on Jun. 17, 2014.

(51) Int. Cl.
*B32B 37/00* (2006.01)
*B29C 65/78* (2006.01)
(Continued)

(52) U.S. Cl.
CPC .......... *B29C 65/7841* (2013.01); *B29C 65/08* (2013.01); *B29C 66/1122* (2013.01); *B29C 66/21* (2013.01); *B29C 66/41* (2013.01); *B29C 66/73921* (2013.01); *B29C 66/816* (2013.01); *B29C 66/8161* (2013.01); *B29C 66/81265* (2013.01); *B29C 66/81429* (2013.01); *B29C 66/81457* (2013.01); *B29C 66/8322* (2013.01); *B29C 66/863* (2013.01);
(Continued)

(58) Field of Classification Search
CPC . B29C 65/784; B29C 65/081; B29C 66/1122; B29C 66/21; B29C 66/41; B29C 66/73921; B29C 66/81265; B29C 66/81429; B29C 66/81457; B29C 66/816; B29C 66/8161; B29C 66/8322; B29C 66/863; B29C 66/92451; B29C 66/9592
USPC .................................. 156/73.1, 580.1, 580.2
See application file for complete search history.

(56) References Cited

U.S. PATENT DOCUMENTS 3,821,048 A * 6/1974 Acker ..................... B29C 65/08
                                                      156/157
4,821,945 A * 4/1989 Chase ................... B23K 20/005
                                                      228/180.5
(Continued)

FOREIGN PATENT DOCUMENTS

CN         102700134 A    10/2012
CN         203356845 U    12/2013

*Primary Examiner* — James Sells
(74) *Attorney, Agent, or Firm* — Quinn IP Law

(57) ABSTRACT

A device for joining thermoplastic workpieces includes an ultrasonic welder including an ultrasonic transducer, a booster and a horn having a welding tip. A clamping mechanism attaches to the ultrasonic welder and includes an upper frame coupled to a boot. The welding tip of the horn of the ultrasonic welder projects into an aperture in the boot of the clamping mechanism. The clamping mechanism exerts a clamping force on the workpieces that differs from a welding force exerted on the workpieces by the ultrasonic welder when the ultrasonic welder is operating to join the thermoplastic workpieces.

14 Claims, 4 Drawing Sheets

(51) Int. Cl.
*B29C 65/08* (2006.01)
*B29C 65/00* (2006.01)

(52) U.S. Cl.
CPC .... *B29C 66/92451* (2013.01); *B29C 66/9592* (2013.01); *B29C 66/71* (2013.01); *B29C 66/7212* (2013.01); *Y10T 156/1702* (2015.01)

(56) References Cited

U.S. PATENT DOCUMENTS

| | | | | |
|---|---|---|---|---|
| 8,728,544 | B1* | 5/2014 | Pritchett | A61J 3/10 424/725 |
| 2008/0023529 | A1* | 1/2008 | Reatherford | B23K 20/10 228/110.1 |
| 2014/0048584 | A1* | 2/2014 | Luechinger | B23K 20/004 228/110.1 |

* cited by examiner

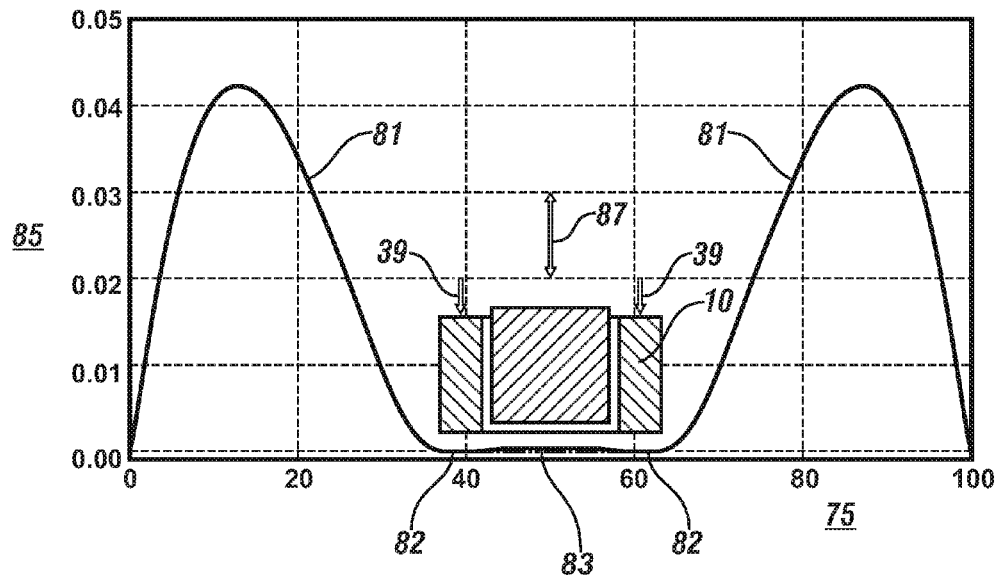
FIG. 3
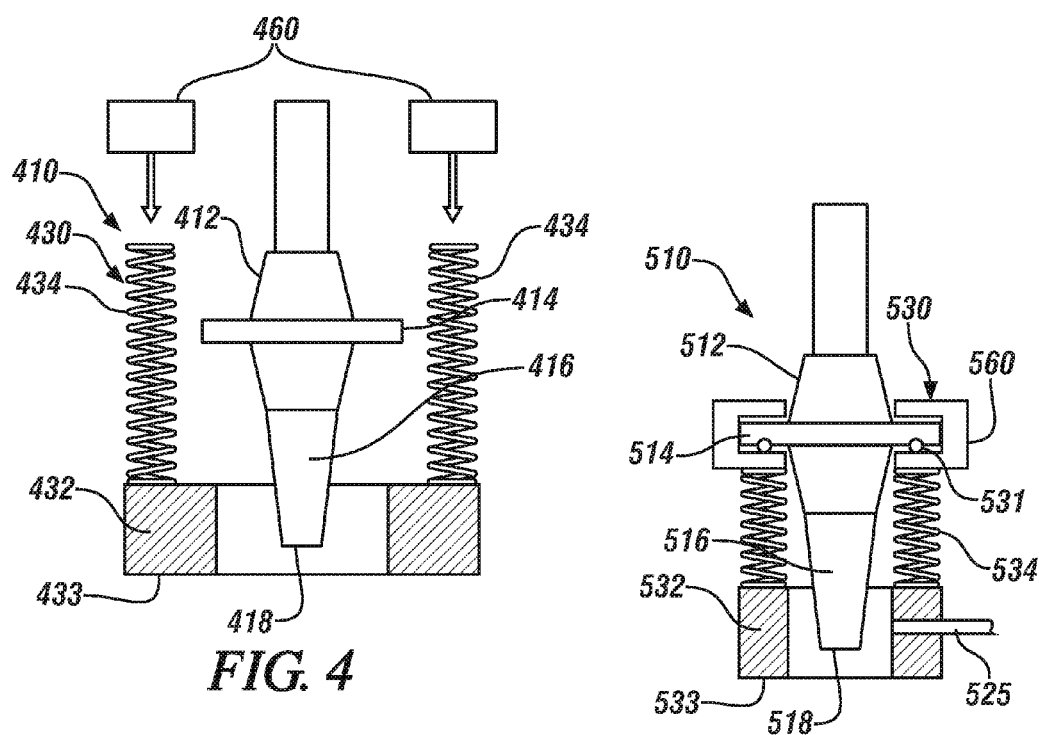
FIG. 4
FIG. 5

ULTRASONIC WELDER CLAMP

CROSS-REFERENCE TO RELATED APPLICATIONS

This application claims the benefit of U.S. Provisional Application No. 62/013,327, filed Jun. 17, 2014, which is hereby incorporated by reference in its entirety.

TECHNICAL FIELD

This disclosure related to devices and methods for ultrasonic welding of workpieces fabricated from polymers or polymer composite materials.

BACKGROUND

Ultrasonic welding is an industrial technique whereby an ultrasonic welding device or welder locally applies high-frequency ultrasonic acoustic vibrations to workpieces that are held together under pressure to create a weld. It is commonly used for welding thermoplastic workpieces. An ultrasonic welding process includes placing contiguous or overlapped workpieces on a nest or anvil and employing an ultrasonic welder to direct high frequency vibration to an interface between the workpieces. An ultrasonic welder preferably includes a converter or piezoelectric transducer, a booster and a sonotrode, also referred to as a horn. The three elements are tuned to resonate at the same ultrasonic frequency, which may be, by way of example, 20, 30, 35 or 40 kHz. The converter converts an electrical signal into a mechanical vibration, the booster modifies the amplitude of the vibration, and the sonotrode clamps the workpieces and applies mechanical vibration thereto to join the workpieces. An electronic ultrasonic generator delivers a high power AC signal with frequency matching the resonance frequency, and is preferably controlled by a controller controlling movement of the welder of the press and delivering the ultrasonic energy. The ultrasonic vibrations generate heat that locally melts materials of the workpieces to form a weld joint.

An ultrasonic welder has a rated maximum welding force. However, known ultrasonic welders deliver vibrational energy to workpieces while clamping the workpieces together with the welder tip. When there are gaps between workpieces, the welding force may be insufficient to effectively clamp the workpieces for ultrasonic welding. Relying on the welding force to close gaps between workpieces may be inefficient because the workpieces may vibrate excessively and with energy delivered outside of an intended weld zone.

SUMMARY

A device for joining thermoplastic workpieces is described, and includes an ultrasonic welder including an ultrasonic transducer, a booster and a horn having a welding tip. A clamping mechanism attaches to the ultrasonic welder and includes an upper frame coupled to a boot. The welding tip of the horn of the ultrasonic welder projects into an aperture in the boot of the clamping mechanism. The clamping mechanism exerts a clamping force on the workpieces that differs from a welding force exerted on the workpieces by the ultrasonic welder when the ultrasonic welder is operating to join the thermoplastic workpieces.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3 graphically shows a selected portion of the data shown with reference to FIG. 2 in two dimensions, including magnitudes of clamping force F and tip force w exerted by the clamp mechanism and the tip, respectively of the applied ultrasonic welder acting upon the pair of stacked workpieces, in accordance with the disclosure;

FIG. 4 schematically illustrates a partial cross-sectional side view of an embodiment of the ultrasonic welder including an ultrasonic transducer, a booster, a horn and a clamp mechanism including compression springs positioned to exert force between a boot and a frame of an end-effector of a robotic arm, in accordance with the disclosure;

FIG. 5 schematically illustrates a partial cross-sectional side view of an embodiment of the ultrasonic welder including an ultrasonic transducer, a booster, a horn, and a clamp mechanism including compression springs positioned to exert force between a boot and a bearing surface coupled to the booster and an air passageway fluidly coupled to a controllable pressurized air supply to cool the tip and the welded surface, in accordance with the disclosure;

FIGS. 6-1 and 6-2 schematically show bottom and side views of embodiments of the clamp mechanism, including a quick-connect attachment device to effect rapid change-out of the clamp mechanism from the ultrasonic welder, in accordance with the disclosure;

FIGS. 7-1, 7-2 and 7-3 show bottom views of embodiments of the lower face of the boot of the clamp mechanism and the ultrasonic welding horn, in accordance with the disclosure;

FIG. 8-1 schematically shows a cross-sectional side view of an embodiment of a boot of the clamp mechanism, wherein a face of the boot that comes into contact with the workpiece has a smooth surface, in accordance with the disclosure; and FIG. 8-2 schematically shows a cross-sectional side view of an embodiment of a boot of the clamp mechanism, wherein a face of the boot that comes into contact with the workpiece has a textured rough, or compressible surface.

DETAILED DESCRIPTION

Figure 1:
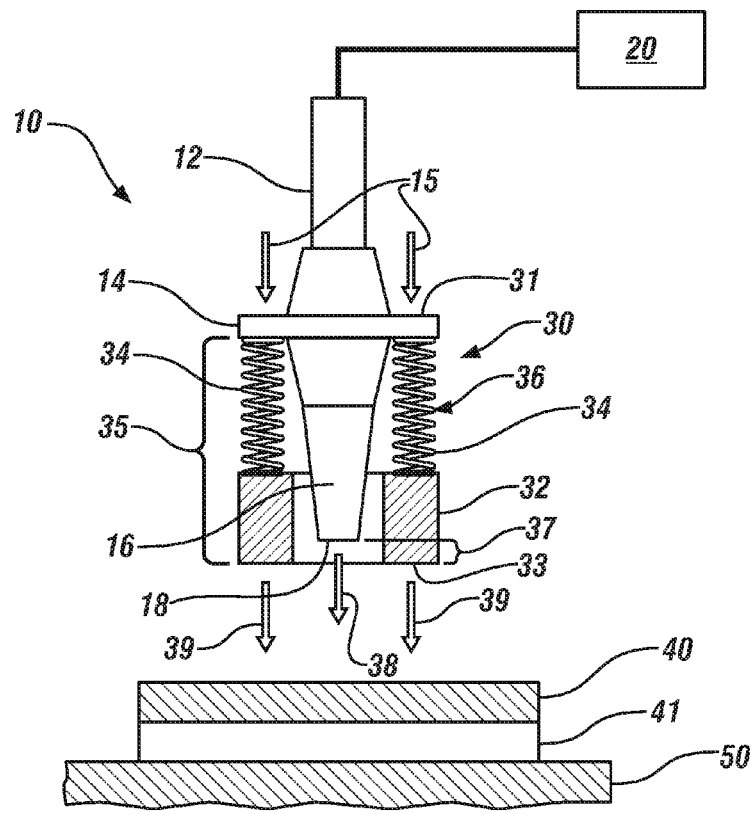
FIG. 1 schematically illustrates a partial cross-sectional side view of an ultrasonic welder including an ultrasonic transducer, a booster, a horn or sonotrode, and a clamp mechanism in accordance with the disclosure.

Referring now to the drawings, wherein the depictions are for the purpose of illustrating certain exemplary embodiments only and not for the purpose of limiting the same, FIG. 1 schematically illustrates a partial cross-sectional side view of an ultrasonic welder 10 that is constructed in accordance with the disclosure. The ultrasonic welder 10 includes an ultrasonic transducer 12, a booster 14, a horn 16 or sonotrode, and a clamp mechanism 30. A sonotrode is a device for converting electrical power to ultrasonic vibrations. Welding energy is transferred thereto from an electronic ultrasonic generator 20. The ultrasonic welder 10 attaches to an end-effector of a robotic arm in one embodiment, which guides placement of the ultrasonic welder 10 and activates the electronic ultrasonic generator 20 to effect ultrasonic welding of contiguous or lapped workpieces 40, 41 that are placed on an anvil 50. Alternatively, the ultrasonic welder 10 may be employed as part of a fixed tooling setup, such as in a hard automatic tooling configuration, on a bench top configuration, or in a pedestal welder configuration. Furthermore, any tooling configuration may be composed of a single ultrasonic welder 10 or, alternatively, multiple ultrasonic welders 10 acting in concert. Workpieces may be fabricated from polymer composite materials, for example thermoplastic materials including without limitation, nylon, polypropylene, polyethylene, polystyrene, and polyester, which may be reinforced with glass or carbon fibers.

The clamp mechanism 30 includes an upper frame 31, a boot 32 and one or a plurality of compression springs 34 arranged in parallel therebetween. The compression springs 34 each has a spring stiffness k 36 that is preferably defined in units of force per unit length. The upper frame 31 mechanically interacts with the booster 14 of the ultrasonic welder 10 to transfer force in some embodiments. The boot 32 is completely or partially annular to a welding tip 18 of the horn 16, and includes a lower face 33 that interacts with one of the workpieces 40 during ultrasonic welding. The boot 32 including its lower face 33 includes an opening or aperture through which the horn 16 of the ultrasonic welder 10 projects when welding.

When the ultrasonic welder 10 is in a relaxed, unapplied state, a longitudinal length of the boot 32 and the springs 34 is designated L 35, and the lower face 33 of the boot 32 extends below the welding tip 18 by a distance ΔL 37. When the ultrasonic welder 10 is in a welding state, the end-effector or other device urges the ultrasonic welder 10 against the workpieces 40, 41, thus applying the lower face 33 of the boot 32 to the workpieces 40, 41 and urging the horn 16 of the ultrasonic welder 10 to project through the boot 32 such that the welding tip 18 is flush with the lower face 33. To achieve a welding force $F_{H2}$ 38 at the welding tip 18, a total force F 15 equal to (F/2+F/2) may be applied by the end-effector to the booster 14 or the upper frame 31, with the compression springs 34 exerting a clamping force 39 of kΔL equal to (kΔL/2+kΔL/2) through the boot 32 onto the workpieces 40, 41 against the anvil 50. The clamp mechanism 30 is configured to provide a consistent clamping force 39 urging the workpieces 40, 41 against the anvil 50 that is decoupled from a tip welding force 38 that is exerted by the welding tip 18 of the horn 16 against the workpieces 40, 41. The horn 16 retracts within the clamp mechanism 30 when unapplied. The distance ΔL 37 may be adjusted depending upon whether there is 1-sided and 2-sided welding and depending upon the stiffnesses and material properties of the workpieces 40, 41.

Clamp design factors include a selectable value for the spring stiffness k 36 of the compression springs 34 to effect the clamping force 39, and may include an adjustable clamping force in one embodiment. The adjustable clamping force 39 may be achieved by a suitable mechanism that variably and controllably adjusts the spring length 35 and relaxed extension of the lower face 33 of the boot 32 below the welding tip 18. A measuring rule or other distance marking device may be implemented on an exterior of the clamp mechanism 30 to indicate magnitude of the clamping force 39.

As such, the ultrasonic welder 10 may be employed to join thermoplastic workpieces 40, 41, and includes the ultrasonic transducer 12, booster 14 and horn 16 having the welding tip 18. The clamping mechanism 30 attaches to the ultrasonic welder 10 and includes the upper frame 31 coupled to the boot 32. The welding tip 18 of the horn 16 of the ultrasonic welder 10 projects into an aperture in the boot 32. The clamping force 39 exerted by the clamping mechanism 30 on the workpieces 40, 41 differs from the tip welding force 38 exerted on the workpieces 40, 41 by the ultrasonic welder 10 when operating. The clamping force 39 and the tip welding force 38 for a specific welding application may be determined employing the analysis described herein.

Figure 2:
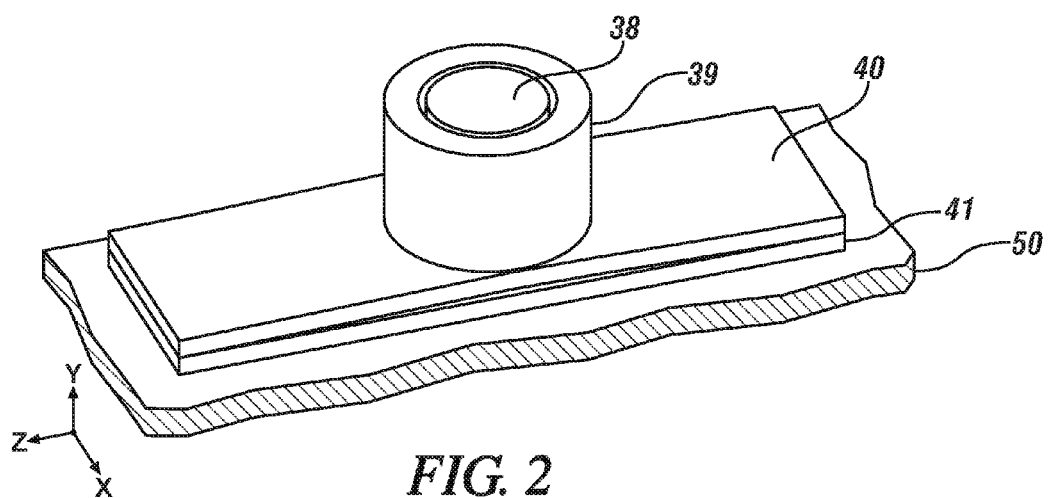
FIG. 2 graphically shows, in a perspective view, magnitudes of clamping force and tip force exerted by a clamp mechanism and a tip, respectively of an applied ultrasonic welder acting upon a pair of stacked workpieces, in accordance with the disclosure.

FIG. 2 graphically shows, in a perspective view, magnitudes of an example where a stack of two workpieces 40, 41 are subject to a clamping force 39 exerted by an embodiment of the clamping mechanism 30 shown with reference to FIG. 1 and a tip welding force 38 exerted by an embodiment of the tip shown with reference to FIG. 1. During ultrasonic welding, the horn 16 generates oscillatory motion of an amplitude in the order of several micrometers to over one hundred micrometers in a direction that is normal to the surface of the workpieces 40, 41 to effect ultrasonic welding.

Figures 1, 7:
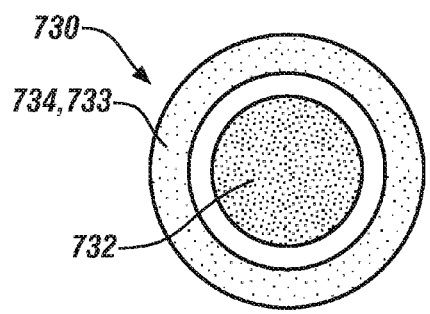
Figures 2, 7:
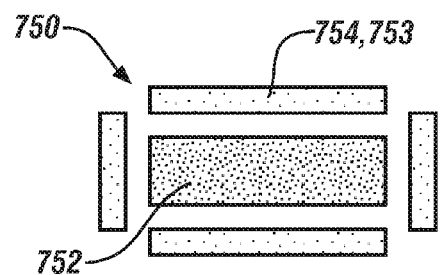
Figures 3, 7:
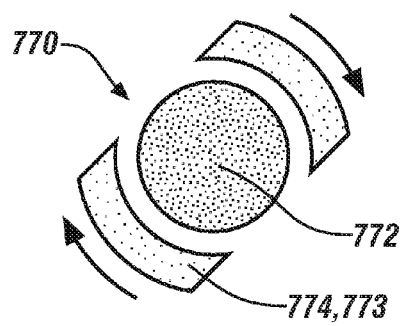

FIG. 3 graphically shows deformation 85 on the vertical axis in relation to linear distance 75 on the horizontal axis, and depicts deformation of a workpiece along its center line at its top in response to clamping force 39 exerted by an embodiment of the clamp mechanism 30 of the ultrasonic welder 10 shown with reference to FIG. 1 against the workpiece placed upon an anvil. Deformations include a first deformation 81 occurring outside the ultrasonic welder 10, a second deformation 82 occurring in response to the clamping force 39, and a third deformation 83 occurring in response to the tip welding force 87 associated with operation of the ultrasonic welder 10 at a known ultrasonic welding frequency. Without the restriction of the workpiece due to urging of the clamp mechanism 30, the whole workpiece would be vibrating with the horn 16 at a much larger magnitude.

FIG. 4 schematically illustrates a cross-sectional side view of an embodiment of the ultrasonic welder 410 including an ultrasonic transducer 412, a booster 414, and a horn 416, all of which are analogous to the corresponding named elements described with reference to FIG. 1. The ultrasonic welder 410 is attached to an end-effector 460 that guides placement of the ultrasonic welder 410 and activates an electronic ultrasonic generator to effect ultrasonic welding of workpieces. The ultrasonic welder 410 includes a clamp mechanism 430 that includes a boot 432 that is completely or partially annular to a welding tip 418 of the horn 416 and one or a plurality of compression springs 434. In this embodiment, the compression springs 434 are positioned to exert force between a face 433 of the boot 432 and a frame of the end-effector 460.

FIG. 5 schematically illustrates a partial cross-sectional side view of an embodiment of the ultrasonic welder 510 including an ultrasonic transducer 512, a booster 514, and a horn 516, all of which are analogous to the corresponding elements described with reference to FIG. 1. The ultrasonic welder 510 is attached via clamp 530 including bracket 560 to an end-effector that guides placement of the ultrasonic welder 510 and activates an electronic ultrasonic generator to effect ultrasonic welding of workpieces. The clamp mechanism 530 includes a boot 532 that is partially annular to a welding tip 518 of the horn 516 and a plurality of compression springs 534. In this embodiment, the compression springs 534 are positioned to exert force between a face 533 of the boot 532 and a bearing surface 531 of the bracket 560 that couples to the booster 514. The bearing surface 531 permits the boot 532 to rotate about a longitudinal axis of the ultrasonic welder 510, either passively in response to movement of the boot 532 around a workpiece or in response to an actuator attached thereto. The boot 532 also includes an air passageway 525 that passes between the outside surface of the boot 532 to an inside surface associated with an aperture in the boot 532. The air passageway 525 fluidly couples to a controllable pressurized air supply that blows air into the aperture near the tip 518 during or subsequent to a welding operation to dissipate heat from the tip 518 and the welded workpieces.

Figures 1, 6:
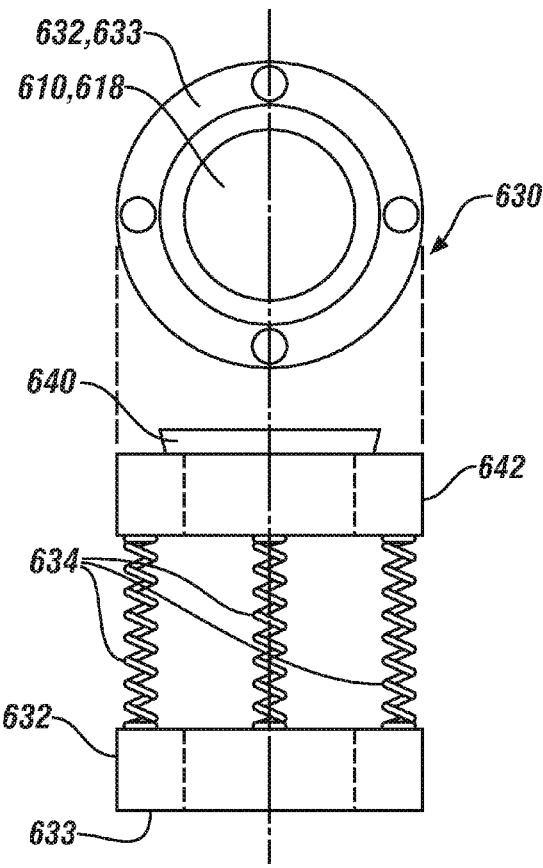
Figures 2, 6:
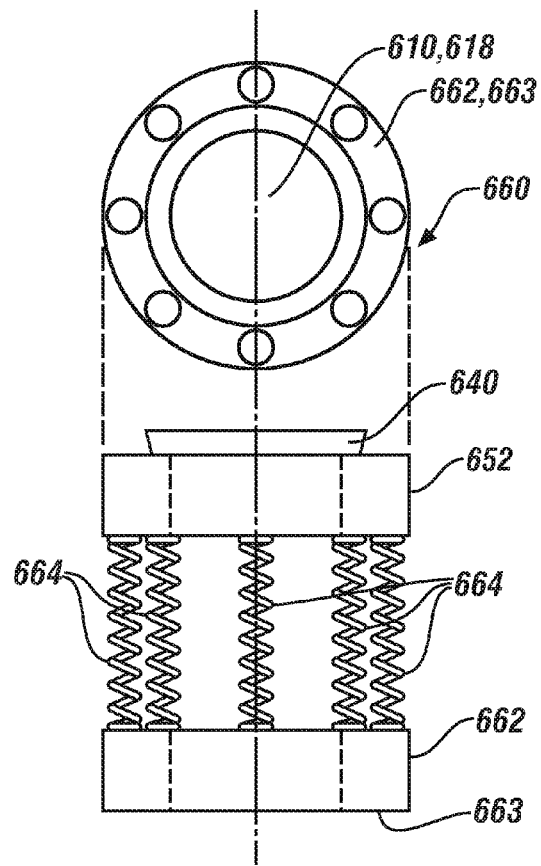

FIG. 6-1 schematically shows bottom and side views of a first embodiment of a clamp mechanism 630 including a quick-connect coupler 640 to effect rapid change-out, i.e., rapid attachment and detachment of the clamp mechanism 630 to the ultrasonic welder 610. The clamp mechanism 630 includes the quick-connect attachment device 640, an upper frame 642, four helically-coiled compression springs 634, three of which are visible in the side view, and a boot 632 having an exterior face 633. The four compression springs 634 are arranged in parallel between the upper frame 642 and the boot 632. The face 633 of the clamping mechanism 630 is annular and the four compression springs 634 are spaced equidistantly around a periphery of the face 633. A tip 618 of the ultrasonic welder 610 is shown.

FIG. 6-2 schematically shows bottom and side views of a second embodiment of a clamp mechanism 660 including the quick-connect coupler 640 to effect rapid change-out, i.e., rapid attachment and detachment of the clamp mechanism 660 to ultrasonic welder 610. The clamp mechanism 660 includes the quick-connect attachment device 640, an upper frame 652, eight helically-coiled compression springs 664, five of which are visible in the side view, and a boot 662 having an exterior face 663. The eight compression springs 664 are arranged in parallel between the upper frame 652 and the boot 662. The face 663 of the clamping mechanism 660 is annularly shaped and the eight compression springs 664 are spaced equidistantly around a periphery of the face 663. The tip 618 of the ultrasonic welder 610 is shown. When the four compression springs 634 of the first embodiment of the clamp mechanism 630 have the same spring constant k as the eight compression springs 664 of the second embodiment of the clamp mechanism 660, the magnitude of clamping force exerted by the second clamp mechanism 660 will be twice that of the first clamp mechanism 630 under the same weld clamping conditions. Alternatively, there may be a single helically-coiled compression spring arranged between the upper frame and the boot, wherein an inside diameter of the helically-coiled compression spring is equivalent to the diameter of the boot.

FIGS. 7-1, 7-2 and 7-3 schematically show bottom views of differently shaped embodiments of tips of an ultrasonic welder including a lower face of a boot of a clamp mechanism and an associated welding tip. FIG. 7-1 schematically shows a bottom view of a first embodiment of an ultrasonic welder 730 that includes a welding tip 732 having a circularly-shaped cross-section, and a concentric annular face 733 of a boot 734. FIG. 7-2 schematically shows a bottom view of a second embodiment of an ultrasonic welder 750 that includes a welding tip 752 having a rectangularly-shaped cross-section, and a corresponding fragmented rectangular face 753 of a boot 754. FIG. 7-3 schematically shows a bottom view of a third embodiment of an ultrasonic welder 770 that includes a welding tip 772 having a circularly-shaped cross-section, and a corresponding fragmented, partial annular face 773 of a boot 774. As shown, the partial boot 774 preferably rotates around the welding tip 772, e.g., as described with reference to the bearing 531 shown in FIG. 5. This configuration may be applied to welding a flange or other configuration that has a narrow accessible dimension. The ability to rotate the boot 774 having a partial annular cross section allows one to quickly align the boot 774 with flanges in different directions without rotating the robotic end-effector.

Figures 1, 8:
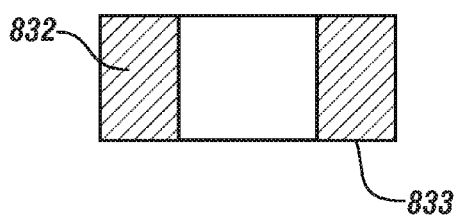
Figures 2, 8:
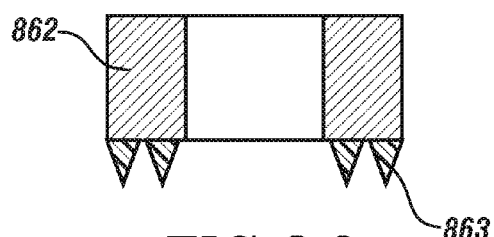

FIG. 8-1 schematically shows a cross-sectional side view of an embodiment of a boot 832 of the clamp mechanism, wherein a lower face 833 of the boot 832 that comes into contact with a workpiece has a smooth, incompressible surface that may be hard finished.

FIG. 8-2 schematically shows a cross-sectional side view of an embodiment of a boot 862 of the clamp mechanism, wherein a face 863 of the boot 862 that comes into contact with the workpiece has a textured, rough or compressible surface to provide an anti-skid surface or to protect the workpiece surface from damage during welding operations. This face 863 is preferably employed when the workpiece is a polymer such as rubber.

Overall, the ultrasonic welder described herein includes an integrated clamp mechanism that provides clamping forces separate from the forces exerted by the ultrasonic welding horn on the workpiece. This allows the ultrasonic welding horn to concentrate ultrasonic energy within a weld zone, and increases the efficiency of ultrasonic welding. Such action reduces power needs and required size of the welder and its associated generator. This also overcomes inertia and avoids diverting clamping energy in order to minimize vibrating of a workpiece in resonance with the horn. Directly integrating the clamping mechanism with the welder simplifies tooling and fixturing, and permits integrated cooling to the horn and the workpieces. In the consolidation or holding stage after ultrasonic vibration is complete, the horn retracts away from the contact surface of the workpieces while the clamp continues to exert clamping force on the workpieces, thus allowing the workpieces to consolidate. Such early retraction of the horn reduces or eliminates occurrence of heat transfer between the horn and the workpieces and facilitates thermal management of the horn. As such, ultrasonic welding quality is improved, and manufacturing tooling complexity welder power can be reduced.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A device for joining thermoplastic workpieces, comprising:
   an ultrasonic welder including an ultrasonic transducer, a booster and a horn having a welding tip;
   a clamping mechanism coupled to the ultrasonic welder and including an upper frame coupled to a boot; and
   the welding tip of the horn of the ultrasonic welder projecting into an aperture in the boot of the clamping mechanism;

wherein the upper frame of the clamping mechanism mechanically couples to the boot via a plurality of compression springs arranged in parallel;

wherein the boot includes an air passageway fluidly coupleable to a pressurized air supply to supply air into the aperture in the boot of the clamping mechanism; and wherein the clamping mechanism exerts a clamping force on the workpieces separate from a welding force exerted on the workpieces by the ultrasonic welder when the ultrasonic welder is operating to join the thermoplastic workpieces.

2. The ultrasonic welder of claim 1, wherein the clamping mechanism exerts the clamping force on the workpieces against an anvil when the ultrasonic welder is joining the thermoplastic workpieces.

3. The ultrasonic welder of claim 1, wherein the boot of the clamping mechanism further comprises a face portion for contacting the workpiece.

4. The ultrasonic welder of claim 3, wherein the face portion of the boot includes a smooth incompressible surface.

5. The ultrasonic welder of claim 3, wherein the face portion of the boot includes a compressible surface.

6. The ultrasonic welder of claim 1, wherein the welding tip of the horn of the ultrasonic welder projects through the aperture of the boot of the clamping mechanism and is flush with the face of the boot when the ultrasonic welder is joining the thermoplastic workpieces.

7. The ultrasonic welder of claim 6, wherein the welding tip of the horn is circularly-shaped and the face of the boot is annular thereto.

8. The ultrasonic welder of claim 6, wherein the welding tip of the horn is circularly-shaped and the face of the boot has a partial annular shaped.

9. The ultrasonic welder of claim 6, wherein the welding tip of the horn is rectangularly-shaped and the face of the boot has a fragmented rectangular shape.

10. A device for joining thermoplastic workpieces, comprising:

an ultrasonic welder including an ultrasonic transducer, a booster and a horn having a welding tip;

a clamping mechanism coupled to the ultrasonic welder and including an upper frame coupled to a boot, wherein the upper frame of the clamping mechanism is rotatably coupled to the booster, and wherein the clamping mechanism rotates about a longitudinal axis of the ultrasonic welder;

the welding tip of the horn of the ultrasonic welder projecting into an aperture in the boot of the clamping mechanism; and wherein the clamping mechanism exerts a clamping force on the workpieces separate from a welding force exerted on the workpieces by the ultrasonic welder when the ultrasonic welder is operating to join the thermoplastic workpieces.

11. The ultrasonic welder of claim 1, wherein the clamping mechanism coupled to the ultrasonic welder comprises the clamping mechanism coupled to the ultrasonic welder via a quick-connect attachment device.

12. A device for joining thermoplastic workpieces, comprising:

an ultrasonic welder including an ultrasonic transducer and a horn having a welding tip;

a clamping mechanism coupled to the ultrasonic welder and including an upper frame coupled to a boot; and the welding tip of the horn of the ultrasonic welder projecting into an aperture in the boot of the clamping mechanism;

wherein the boot includes an air passageway fluidly coupleable to a pressurized air supply that blows air onto the horn of the ultrasonic welder;

wherein the clamping mechanism exerts a clamping force on the workpieces against an anvil; and wherein the ultrasonic welder exerts mechanical vibration on one of the workpieces to join the thermoplastic workpieces when the clamping mechanism exerts the clamping force on the workpieces against the anvil.

13. The ultrasonic welder of claim 12, wherein the upper frame of the clamping mechanism mechanically couples to the boot via a plurality of compression springs arranged in parallel, the boot including a lower face portion for contacting the workpiece.

14. The ultrasonic welder of claim 12, wherein the welding tip of the horn of the ultrasonic welder projects through the aperture of the boot of the clamping mechanism and is flush with the lower face of the boot when the ultrasonic welder exerts mechanical vibration on one of the workpieces to join the thermoplastic workpieces.

* * * * *